United States Patent [19]

Lee

[11] Patent Number: 5,963,526
[45] Date of Patent: Oct. 5, 1999

[54] RADIALLY RECIPROCATING CLEANING DEVICE FOR COMPACT DISC

[76] Inventor: Jean Chin Chu Lee, 2nd Floor, No. 3, Lane 50, Song-Ping Road, Taipei City, Taiwan

[21] Appl. No.: 09/072,135

[22] Filed: May 5, 1998

Related U.S. Application Data

[63] Continuation-in-part of application No. 09/001,516, Dec. 31, 1997.
[51] Int. Cl.⁶ .............................. G11B 3/58; A47L 25/00; B08B 11/02
[52] U.S. Cl. ........................ 369/72; 15/97.1; 15/DIG. 14
[58] Field of Search ........................ 369/71–74; 360/128; 15/97.1, 102, 256.5, DIG. 13, DIG. 14

[56] References Cited

U.S. PATENT DOCUMENTS

| | | |
|---|---|---|
| 4,556,433 | 12/1985 | Clausen . |
| 4,561,142 | 12/1985 | Mischenko et al. ...................... 15/97.1 |
| 4,713,856 | 12/1987 | Clausen . |
| 5,416,761 | 5/1995 | Lee ............................................ 369/72 |
| 5,822,822 | 10/1998 | Weng ........................................ 369/72 |

Primary Examiner—George J. Letscher
Attorney, Agent, or Firm—Rosenberg, Klein & Bilker

[57] ABSTRACT

A radially reciprocating cleaning device for compact disc, including: a lower casing in which a retaining wheel is rotatably disposed, a circumference of the retaining wheel being formed with a gear section: an upper casing one end of which is pivotally connected with the lower casing for snugly mating the upper casing with the lower casing; and a cleaning mechanism including a slide board slidably disposed on a bottom of the upper casing and connected with at least one wiping member positioned on a compact disc rested on the retaining wheel. The cleaning mechanism further includes a rotary tray rotatably mounted on the upper casing for driving a cam disc to rotate. A driving post of the cam disc is slidably fitted in a longitudinal guide slot of the slide board, whereby when the upper and lower casings are mated with each other, a driving gear projecting from bottom end of the cam disc drivingly meshes with the gear section of the retaining wheel. Accordingly, by means of rotating the rotary tray, the cam disc rotarily drives the retaining wheel and makes the slide board linearly reciprocally slide. At this time, the wiping member connected with the slide board radially reciprocally wipes the compact disc to clean up the dirts accumulating thereon.

3 Claims, 7 Drawing Sheets

FIG.7

RADIALLY RECIPROCATING CLEANING DEVICE FOR COMPACT DISC

CROSS-REFERENCE TO RELATED APPLICATION

This application is a Continuation-in-Part Application of U.S. patent application Ser. No. 09/001,516, entitled "A Radially reciprocating Compact Disc Cleaner", filed on Dec. 31, 1997, now pending.

BACKGROUND OF THE INVENTION

1. Field of the Invention

The present invention is related to a radially reciprocating cleaning device for compact disc, and more particularly to a cleaning device for compact disc, in which when the upper and lower casings are mated with each other and a rotary tray is rotated, a cam disc to be cleaned is rotarily driven and a wiping member is also driven to radially reciprocally wipe the compact disc for cleaning up the dirts accumulating thereon.

2. Description of the Prior Art

It is known that the dirts accumulating on the surface of a compact disc will affect the reading of the data of the compact disc. Therefore, it is often necessary to clean and wipe off the dirts from the surface of the compact disc. The right way to wipe the compact disc is to radially straightly wipe the compact disc, that is, in a direction from the center to the circumference. Many measures have been developed for cleaning the compact disc. For example, U.S. Pat. No. 4,556,433 shows a support member rotatably mounted on a base for supporting a disc. A cleaning member has a downward facing circumferential surface and the support member. A drive means is operatively connected between the support member and the cleaning member in such a manner that rotation of one of the support member and the cleaning member causes a relative rotation of the other.

U.S. Pat. No. 4,713,865 shows a support member having a middle support axis in order to be rotatably mounted on a base for supporting a disc-like object. A cleaning member has a cleaning axis parallel to the support axis to position at the object supported on the support member. A driving means is operatively connected between the support member and the cleaning member in such a manner that relative rotation of one of the support member and the cleaning member effects relative rotation of the other.

In U.S. patent application Ser. No. 09/001,516 "A Radially Reciprocating Compact Disc Cleaner" filed on Dec. 31, 1997 by the applicant of this application, a cleaner is disclosed, including: a lower casing 1 in which a retaining wheel 11 is rotatably disposed, a compact disc to be cleaned being rested on the retaining wheel 11; an upper casing 2 one end of which is pivotally connected with the lower casing 1; and a cleaning mechanism 3 having a rotary tray 31 rotatably mounted on the upper casing 2 for driving a rotary disc 312 to rotate. A driving wheel 32 is rotatably mounted on the bottom of the upper casing 2 and rotarily driven by the rotary disc 312. When the upper and lower casings 2, 1 are mated with each other, the driving wheel 32 is leaned against the compact disc for driving the same. A slide board 33 is slidably mounted on the bottom of the upper casing 2. A first end of the slide board is fixedly connected with a cleaning member 332, while a second end thereof is formed with a longitudinal guide slot 333 for a driving post 312a of the rotary disc 312 to slidably fit therein. The slide board 33 is driven by the driving post 312a to linearly reciprocally slide, whereby the cleaning member 332 radially linearly wipes the compact disc. Such cleaner has relatively complicated structure.

SUMMARY OF THE INVENTION

It is a primary object of the present invention to a radially reciprocating cleaning device for compact disc, including: a lower casing in which a retaining wheel is rotatably disposed, a circumference of the retaining wheel being formed with a gear section: an upper casing one end of which is pivotally connected with the lower casing for snugly mating the upper casing with the lower casing; and a cleaning mechanism including a slide board slidably disposed on a bottom of the upper casing and connected with at least one downward extending wiping member positioned on a compact disc rested on the retaining wheel. The cleaning mechanism further includes a rotary tray rotatably mounted on the upper casing for driving a cam disc to rotate. A driving post of the cam disc is slidably fitted in a longitudinal guide slot of the slide board, whereby when the upper and lower casings are mated with each other, a gear projecting from bottom end of the cam disc drivingly meshes with the gear section of the retaining wheel. Accordingly, by means of rotating the rotary tray, the cam disc rotarily drives the compact disc rested on the retaining wheel and makes the slide board linearly reciprocally slide. At this time, the wiping member connected with the slide board radially reciprocally wipes the compact disc to clean up the dirts accumulating thereon.

The present invention can be best understood through the following description and accompanying drawings, wherein:

DETAILED DESCRIPTION OF THE PREFERRED EMBODIMENTS

Please refer to FIGS. 1 to 7. The cleaning device of the present invention includes: a lower casing 1 in which a retaining wheel 11 is rotatably disposed for a compact disc 4 to rest thereon; an upper casing 2 pivotally connected with the lower casing 1; and a cleaning mechanism 3 at least including a rotary tray 31 rotatably mounted on the upper casing 2. The rotary tray 31 serving to drive a cam disc 312 to rotate. When the upper and lower casings 2, 1 are mated with each other, the cam disc 312 at the same time drives the retaining wheel 11 to rotate and drives a slide board 33 to linearly reciprocally slide. At least one wiping member 332 is connected with the slide board 33, whereby when the slide board 33 is linearly reciprocally slided, the wiping member 332 radially reciprocally wipes the compact disc 4. Accordingly, the compact disc 4 is prevented from being damaged and a good cleaning effect is achieved.

Figure 1:
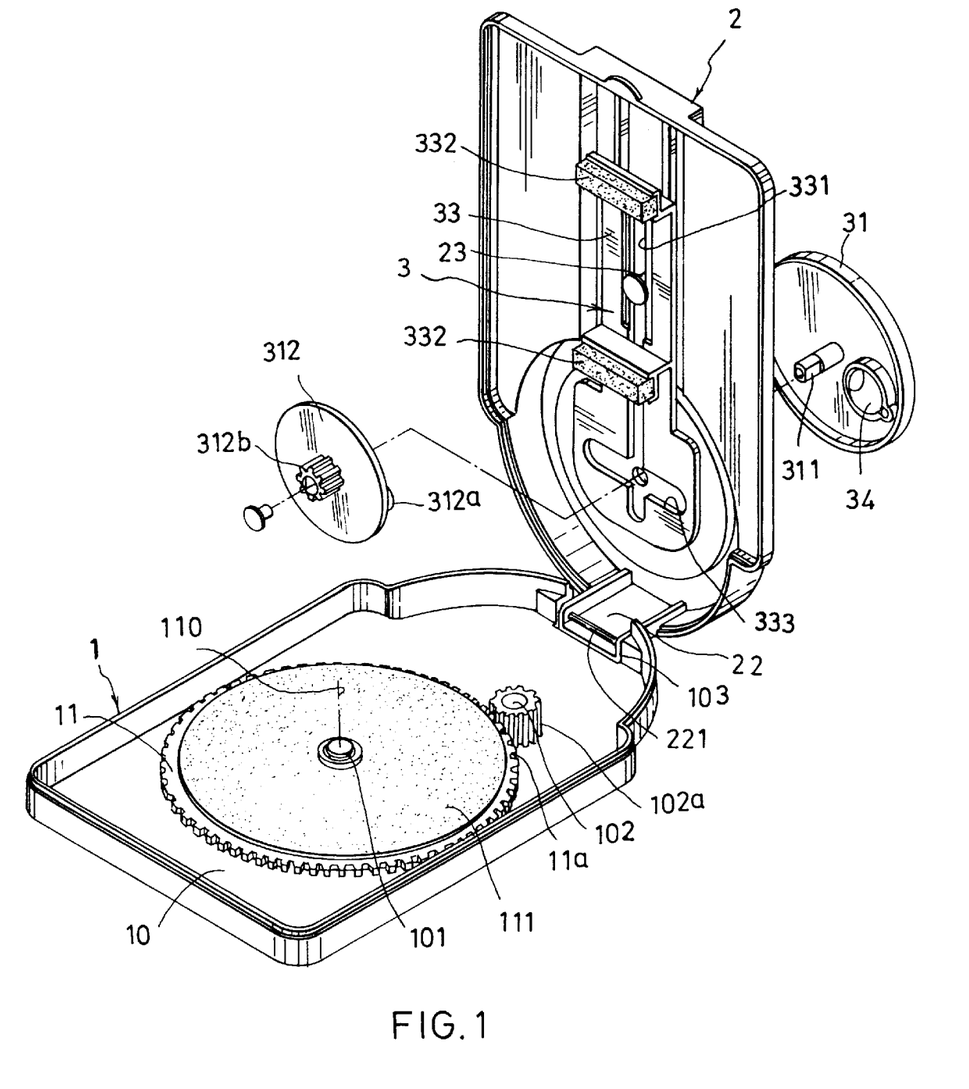
FIG. 1 is a perspective partially exploded view of the present invention.
Figure 2:
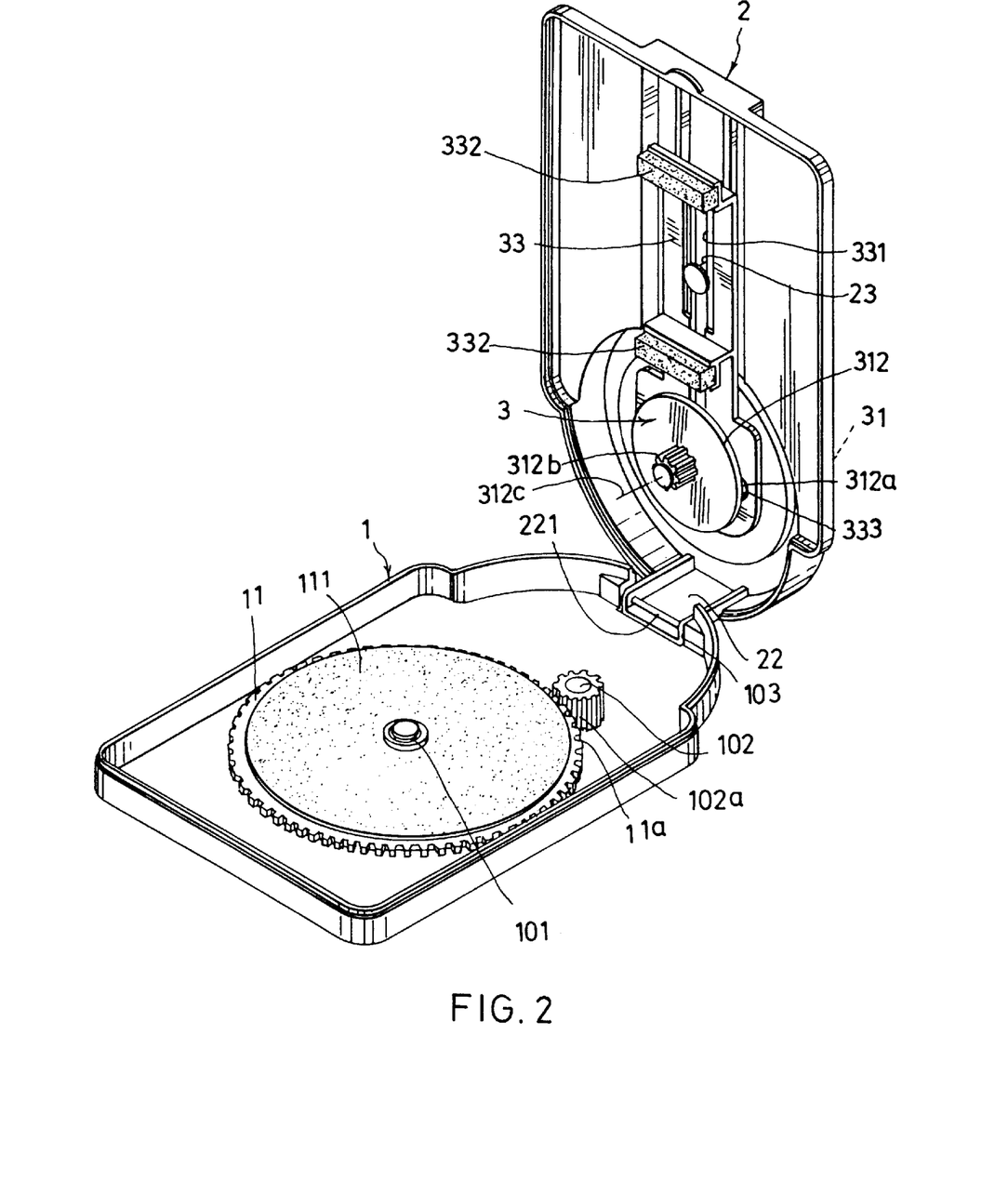
FIG. 2 is a perspective assembled view of the present invention, in which the upper and lower casings are opened.
Figure 3:
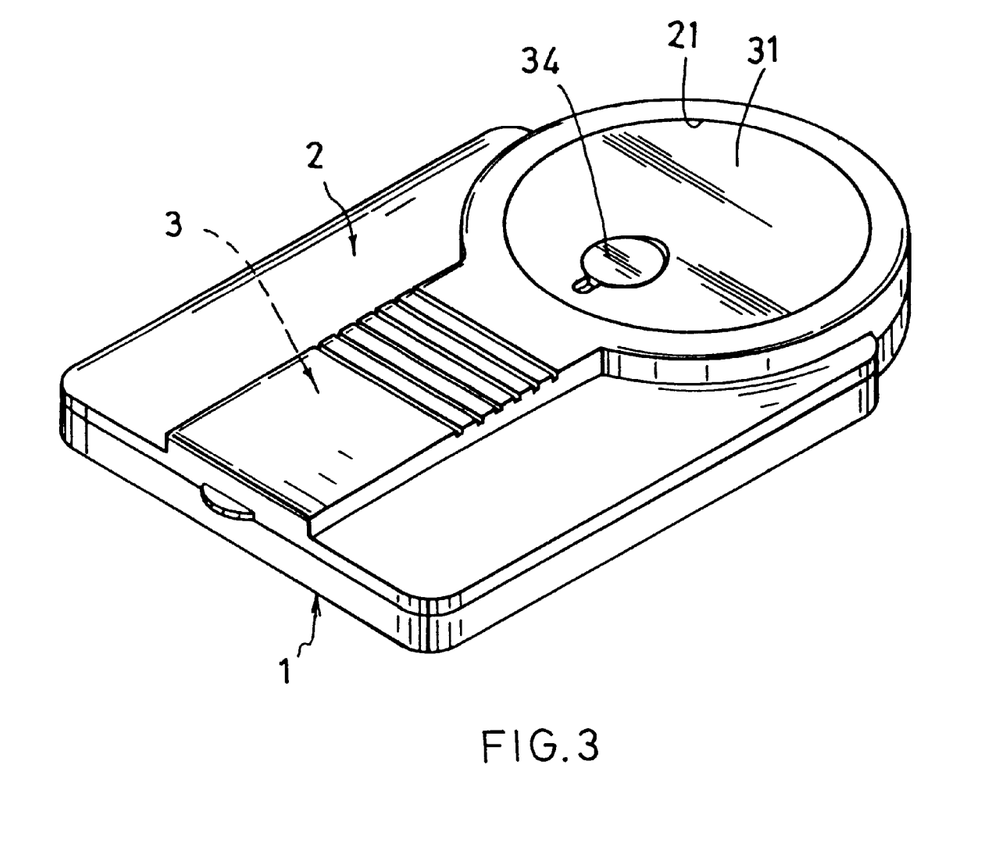
FIG. 3 is a perspective assembled view of the present invention, in which the upper and lower casings are mated with each other.

The lower casing 1 includes: a base board section 10 having an upward projecting first pivot shaft 101 on which the retaining wheel 11 is rotatably mounted, a circumference of the retaining wheel 11 being formed with a gear section 11a, a protective pad layer 111 being laid over top face of the retaining wheel 11 for a compact disc 4 to rest thereon; a second pivot shaft 102 upward projecting from the base board section 10 for rotatably mounting a gear 102a thereon, the gear 102a being engaged with the gear section 11a of the retaining wheel 11; and a pivot seat 103 formed on one side of the lower casing 1 for pivotally connecting with the upper casing 2. The protective pad layer 111 can be made of soft materials such as foam, rubber, etc. without limitation.

The outer face of the upper casing 2 is formed with a recess 21 and a through hole 211 for rotatably fitting the rotary tray 31 of the cleaning mechanism 3 therein. A pivot section 22 projects from one side of the upper casing 2. The pivot section 22 via a pivot pin 221 is pivotally connected with the pivot seat 103 of the lower casing 1, whereby the upper casing 2 can be snugly mated with the lower casing 1.

Figure 4:
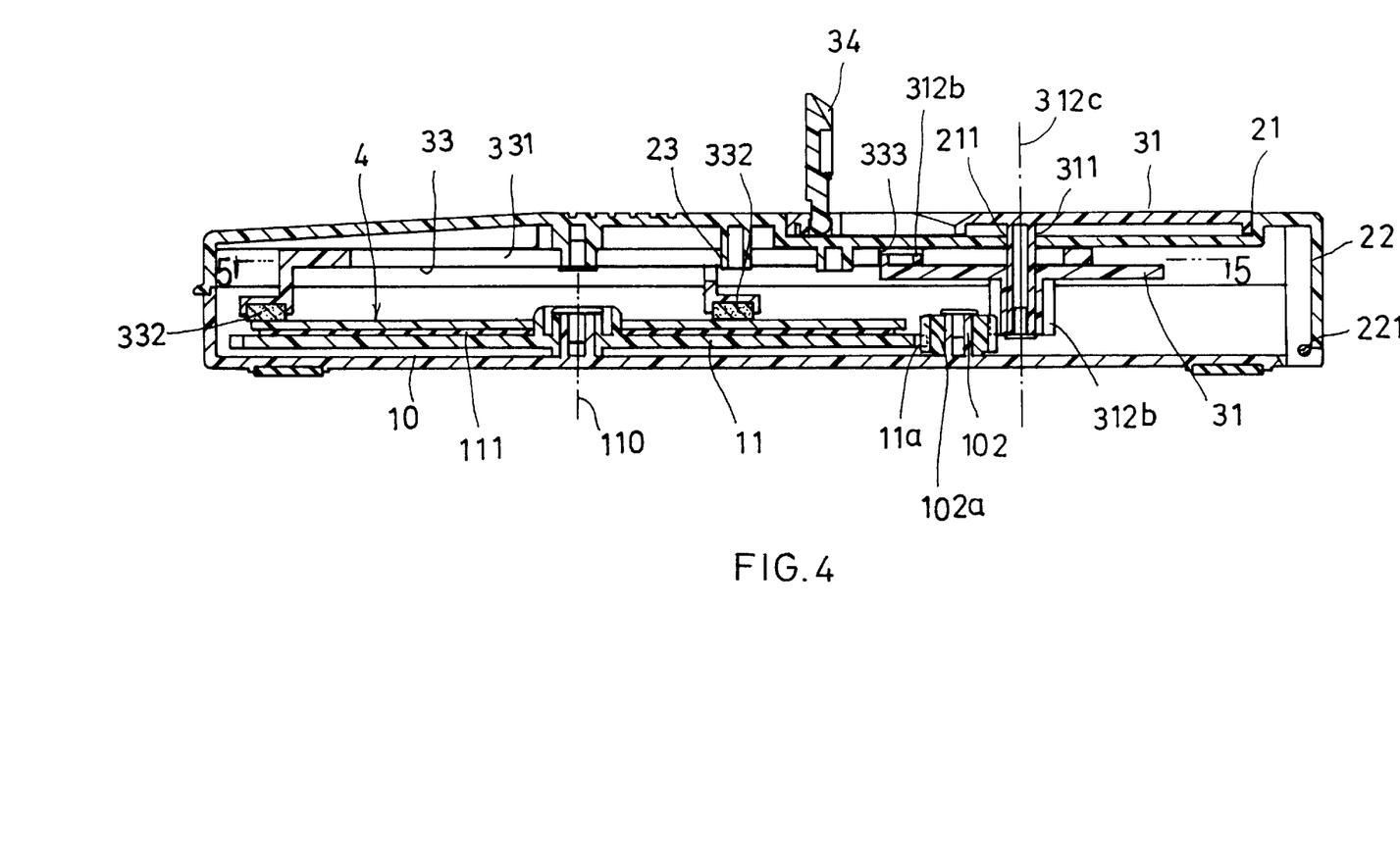
FIG. 4 is a sectional view showing that the slide board is pushed outward when cleaning the compact disc.
Figure 5:
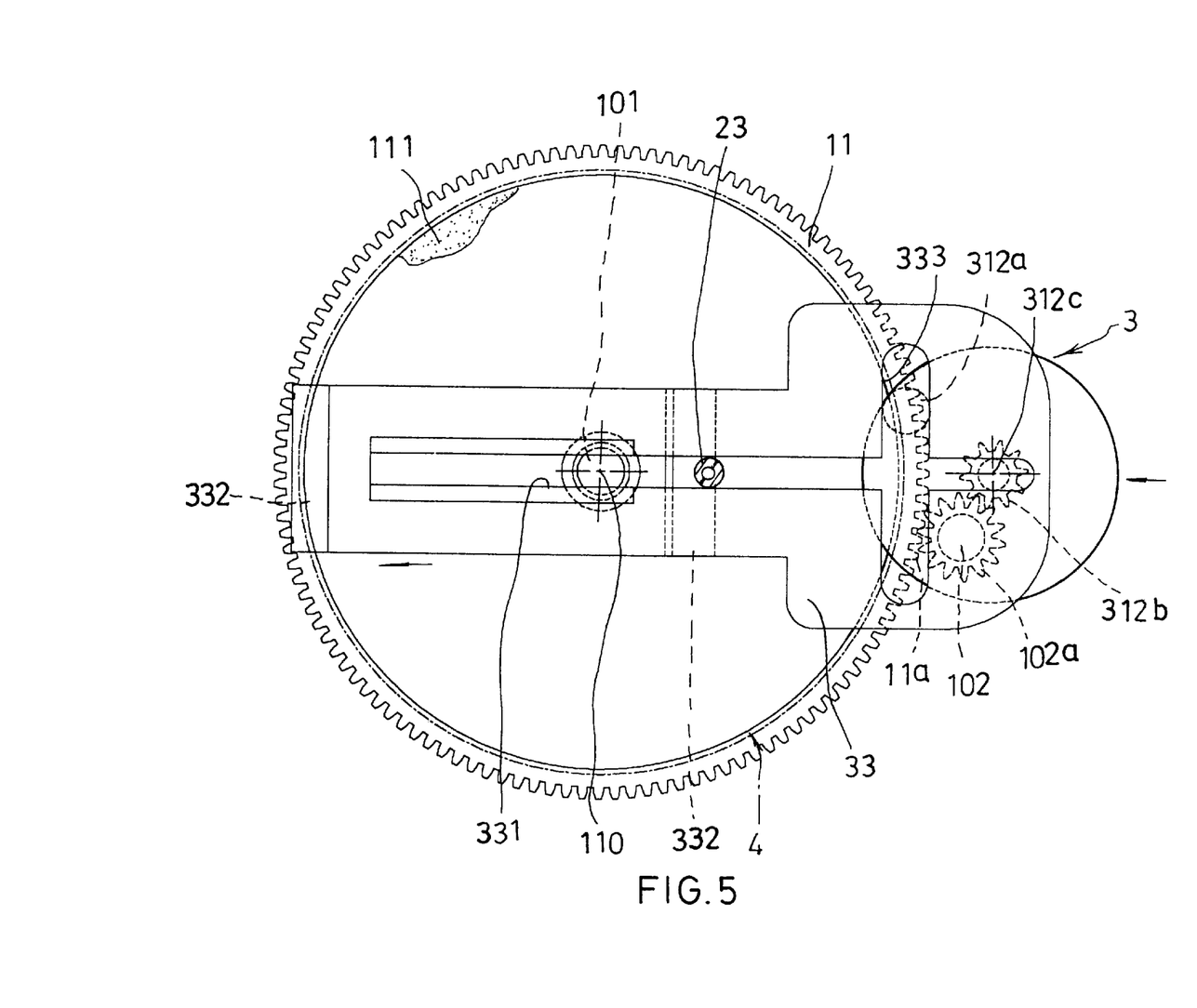
FIG. 5 is a sectional view taken along line 5—5 of FIG. 4.
Figure 6:
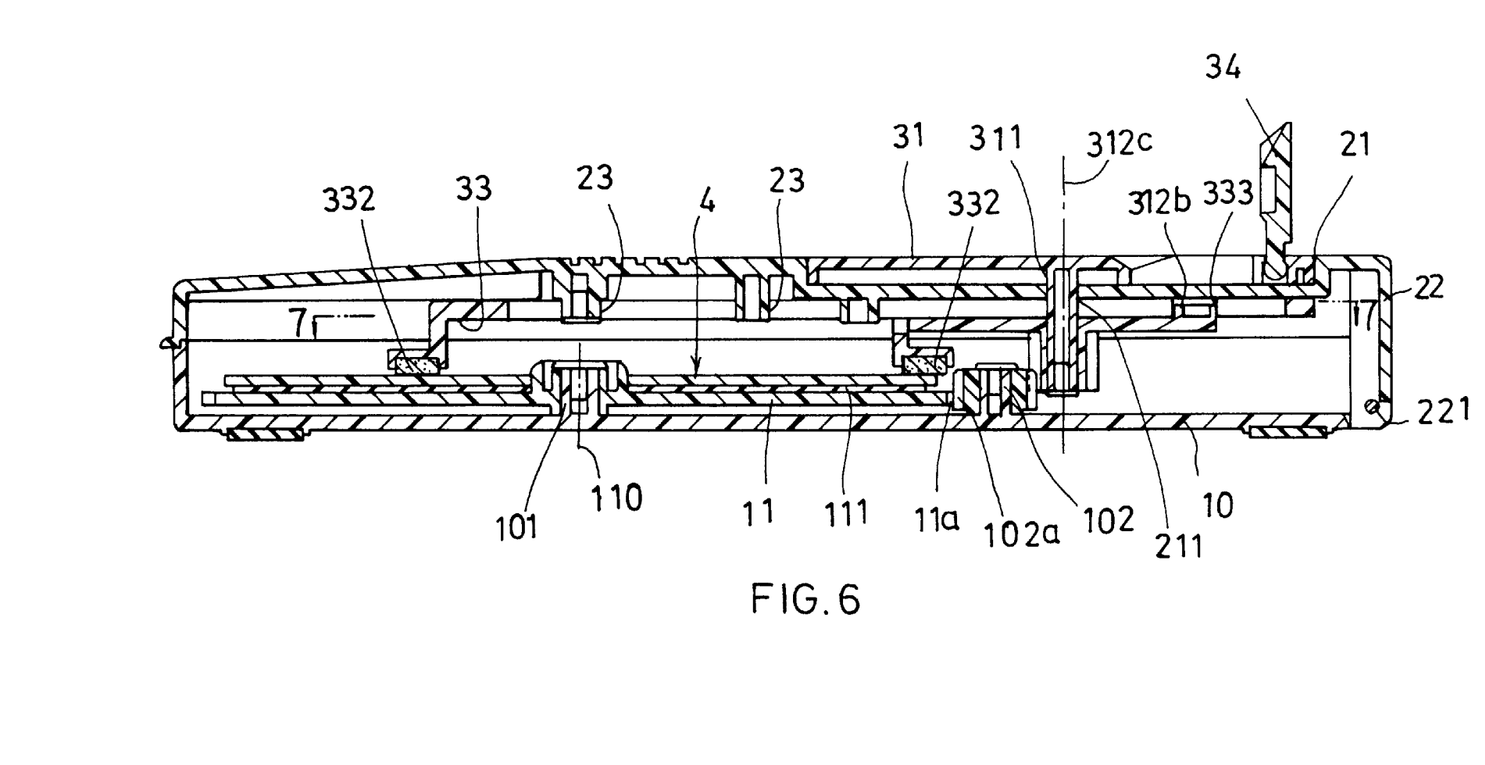
FIG. 6 is a sectional view showing that the slide board is pulled back when cleaning the compact disc.
Figure 7:
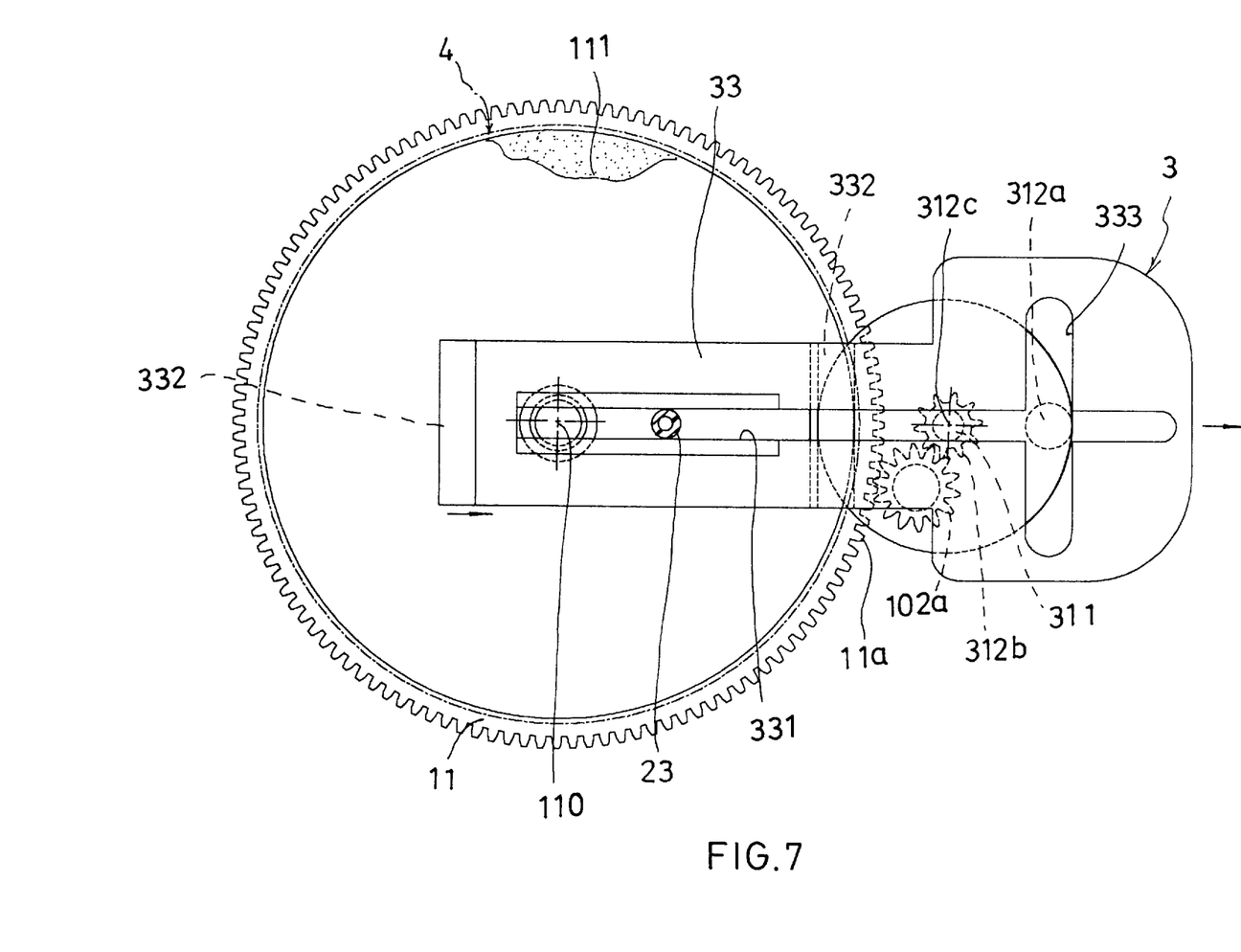
FIG. 7 is a sectional view taken along line 7—7 of FIG. 6.

The cleaning mechanism 3 includes: a rotary tray 31 having a rotary shaft 311 projecting from bottom face thereof, the rotary shaft 311 being passed through the through hole 211 of the upper casing 2 so as to stably rotatably mount the rotary tray 31 in the recess 21 of the upper casing 2, a free end of the projecting shaft 311 being connected with a cam disc 312 having a driving post 312a axially projecting from inner face thereof, the cam disc 312 further having a driving gear 312b outward projecting from the center of the cam disc 312, when the upper and lower casings 2, 1 are mated with each other, the driving gear 312a being engaged with the gear 102a mounted on the second pivot shaft of the lower casing 1, whereby when rotating the rotary tray 31, the driving gear 312b of the cam disc 312 is driven to rotarily drive the retaining wheel 11; and a slide board 33 formed with an axial guide slot 331. A guide post 23 downward projects from the upper casing 2. The guide post 23 and the projecting shaft 311 of the rotary tray are slidably fitted in the guide slot 331, whereby the slide board 33 is linearly slidable along the guide post 23 and the projecting shaft 311. (The projecting shaft 311 and the guide post 23 are linearly arranged.) The bottom of a first board section of the slide board 33 is fixedly connected with a wiping member 332. A second board section of the slide board 33 is formed with a longitudinal guide slot 333 in which the driving post 312a of the cam disc 312 is slidably fitted. Accordingly, when the upper and lower casings 2, 1 are mated with each other and the rotary tray 31 is rotated to rotarily drive the cam disc 312, not only the driving gear 312b of the cam disc will rotarily drive the retaining wheel 11 (that is, rotarily drive the compact disc 4 placed on the retaining wheel 11), but also the driving post 312a will revolve within the longitudinal guide slot 333 of the slide board, that is, revolve about the rotary center 312c of the cam disc 312. Therefore, the driving post 312a will leftward push (as shown in FIGS. 4, 5) or rightward pull back (as shown in FIGS. 6, 7) the slide board 33. Accordingly, the slide board 33 is linearly reciprocated. At this time, the wiping member 332 connected with bottom end of the slide board 33 radially reciprocally wipes the compact disc 4 to clean up the dirts accumulating thereon.

As shown in FIGS. 1, 4 and 6, the bottom end of the first board section of the slide board 33 is disposed with two downward extending wiping members 332 respectively on two sides. When the upper and lower casings 2, 1 are mated with each other, the two wiping members 332 are respectively positioned on two sides of the rotary center 110 of the retaining wheel 11, that is, positioned on two sides of the compact disc 4 to be cleaned. When one of the wiping members 332 is adjacent to the rotary center 110, the other is away from the rotary center. Therefore, the two wiping members 332 are moved along with the slide board 33 to radially linearly reciprocally wipe the compact disc 4. Such arrangement achieves a cleaning effect twice that of one single wiping member.

A rocking arm 34 is pivotally mounted on the rotary tray 31 for a user to more conveniently rotate the rotary tray 31.

The compact disc cleaning device of the present invention has the following features and advantages:

1. The cleaning mechanism 3 of the present invention via the cam disc 312 directly drives the slide board 33 and the retaining wheel 11. This simplifies the structure of the cleaning device. (In this invention, the gear set 30 and linking wheel 32 of the fore-application are omitted.) Also, the assembling procedure of the present invention is more easy.
2. The driving gear 312b of the cam disc 312 meshes with the retaining wheel 11 so as to actually drive the compact disc 4. This achieves more reliable and satisfactory cleaning effect.
3. Two wiping members 332 are connected to the bottom of the slide board 33 so as to achieve a cleaning effect twice that of the original application. Also, the cleaning time is shortened to half of that of the original application. This greatly enhances the cleaning efficiency.
4. The wiping members 332 are positioned respectively on two sides of the center of the compact disc 4 to evenly contact with the two sides. Therefore, the compact disc 4 can be rotated more evenly and stably. This also greatly enhances the cleaning effect.

It should be noted that the above description and accompanying drawings are only used to illustrate one embodiment of the present invention, not intended to limit the scope thereof. Many modifications of the embodiment can be made without departing from the spirit of the present invention. For example, the second pivot shaft 102 of the lower casing 1 and the gear 102a mounted thereon can be omitted. When the upper and lower casings 2, 1 are mated with each other, the driving gear 312b of the cam disc 312 directly meshes with the gear section 11a of the retaining wheel 11 so as to directly rotarily drive the retaining wheel 11.

What is claimed is:

1. A radially reciprocating cleaning device for compact disc, comprising:
   (a) a lower casing including a base board section on which a retaining wheel is rotatably mounted, a circumference of the retaining wheel being formed with a gear sectiona, a protective pad layer being laid over top face of the retaining wheel for resting a compact disc thereon;
   (b) an upper casing one end of which is pivotally connected with the lower casing for snugly mating the upper casing with the lower casing; and
   (c) a cleaning mechanism including a rotary tray rotatably mounted on the upper casing, the rotary tray being drivingly connected to a cam disc having a driving post projecting from inner face thereof, the cam disc further having a driving gear axially projecting from a center of the cam disc, whereby when the upper and lower casings are mated with each other, the driving gear is drivingly engaged with the gear section of the retaining wheel, the cleaning mechanism further including a slide board slidably disposed on a bottom of the upper casing, a bottom of a first board section of the slide board being fixedly connected with at least one wiping member, a second board section of the slide board 33 being formed with a longitudinal guide slot in which the driving post of the cam disc is slidably fitted, whereby the driving post of the cam disc drives the slide board to linearly reciprocally slide and the wiping member radially reciprocally wipes the compact disc.

2. A cleaning device as claimed in claim 1, wherein the bottom end of the first board section of the slide board is disposed with two downward extending wiping members respectively on two sides, whereby when the upper and lower casings are mated with each other, the two wiping members are respectively positioned on two sides of the rotary center of the retaining wheel.

3. A cleaning device as claimed in claim 1, wherein a gear is rotatably disposed on the base board section of the lower casing to mesh with the gear section of the retaining wheel, whereby when the upper and lower casings are mated with each other, the gear is engaged with the driving gear of the cam disc.

* * * * *